(12) United States Patent
Richardson et al.

(10) Patent No.: US 10,393,281 B2
(45) Date of Patent: Aug. 27, 2019

(54) COMPRESSOR SURGE PROTECTION

(71) Applicant: The Boeing Company, Chicago, IL (US)

(72) Inventors: Marcus Karel Richardson, Everett, WA (US); David M. Smith, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 15/334,262

(22) Filed: Oct. 25, 2016

(65) Prior Publication Data
US 2018/0112783 A1    Apr. 26, 2018

(51) Int. Cl.
| | |
|---|---|
| F16K 17/04 | (2006.01) |
| B64D 41/00 | (2006.01) |
| B64D 43/00 | (2006.01) |
| F16K 31/122 | (2006.01) |
| F16K 3/24 | (2006.01) |
| F16K 3/26 | (2006.01) |
| B64D 27/02 | (2006.01) |
| F02C 7/277 | (2006.01) |

(52) U.S. Cl.
CPC ............ F16K 17/046 (2013.01); B64D 41/00 (2013.01); B64D 43/00 (2013.01); F16K 3/24 (2013.01); F16K 3/265 (2013.01); F16K 17/04 (2013.01); F16K 31/122 (2013.01); F16K 31/1221 (2013.01); F16K 31/1223 (2013.01); B64D 27/02 (2013.01); F02C 7/277 (2013.01)

(58) Field of Classification Search
CPC .... F16K 17/04; F16K 31/122; F16K 31/1221; F16K 31/1223; F16K 17/046; F16K 3/265; F16K 3/24; B64D 41/00; B64D 43/00

USPC ............................................ 251/121; 137/528
See application file for complete search history.

(56) References Cited

U.S. PATENT DOCUMENTS

| | | |
|---|---|---|
| 6,283,138 B1 | 9/2001 | Friend et al. |
| 2002/0096654 A1 | 7/2002 | Holloway, Jr. |

(Continued)

FOREIGN PATENT DOCUMENTS

| | | |
|---|---|---|
| EP | 1526312 A1 | 4/2005 |
| EP | 1970607 A1 | 9/2008 |
| EP | 3045699 A1 | 7/2016 |

OTHER PUBLICATIONS

Search Report for related European Application No. EP17195706.1; report dated Nov. 27, 2017.

*Primary Examiner* — P. Macade Nichols
(74) *Attorney, Agent, or Firm* — Miller, Matthias & Hull LLP

(57) ABSTRACT

A pressure relief system is provided and a corresponding method for relieving pressure from a duct routing a gas from a compressor to a load utilizing the same. According to one aspect, a pressure relief assembly, located near the load, and independent of the primary load compressor pressure relief valve, for use with a duct includes a cover, first and second chambers, and a piston. The piston provides a moveable wall between the chambers and is coupled to the cover. As gas from the duct enters the two chambers, the configuration of the chambers provides for a pressure differential that moves the piston and the corresponding cover. This movement transitions the cover from a closed configuration that seals the duct to an open configuration that allows gas within the duct to escape.

20 Claims, 7 Drawing Sheets

(56) References Cited

U.S. PATENT DOCUMENTS

| | | | |
|---|---|---|---|
| 2006/0284018 A1 | 12/2006 | Carns et al. | |
| 2010/0162708 A1* | 7/2010 | Erickson | F02C 7/232 60/734 |
| 2012/0273055 A1* | 11/2012 | Lirette | E21B 21/103 137/14 |
| 2013/0247995 A1 | 9/2013 | Ehrlich | |
| 2013/0333365 A1* | 12/2013 | Silet | F04D 27/023 60/327 |
| 2016/0139616 A1 | 5/2016 | Mellah et al. | |
| 2017/0152860 A1* | 6/2017 | Miclea-Bleiziffer | F04D 29/462 |

* cited by examiner

COMPRESSOR SURGE PROTECTION

BACKGROUND

Pneumatic systems often include one or more compressors that can experience surge events in which pressure associated with the load may rapidly increase. At least some aircraft engines are typically started with the assistance of an auxilliary power unit (APU). The APU provides the aircraft with electrical and pneumatic power. Pressurized air from the APU load compressor is routed to an aircraft engine via a duct system where the pressurized air drives a turbine at the engine to generate power and rotation on the engine shaft for engine start. If the aircraft engine, or other pneumatic load, stops utilizing the pressurized air, then the potential exists for a surge condition in which the pressure within the duct increases back to the APU. Conventionally, a surge valve is integrated into the APU to prevent surge conditions. However, the surge valve may take more time than is desirable to open. Because the surge valve is physically located within or at the APU, if the surge valve does not respond quickly enough, then the surge condition may reach the compressor before the integrated surge protection valve can open.

Surge protection within APUs is typically designed for a particular aircraft and engine platform. If components within that aircraft or engine system are modified, the surge protection may not be adequate. For example, if an aircraft is upgraded with new engines that have different starting and operating specifications than the engines for which the APU was originally utilized, then the surge protection that is integrated with the APU may not be adequate. Redesigning or replacing the APU within an aircraft to accommodate engine or other aircraft component changes may be costly and time consuming.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for a pressure relief assembly and system and corresponding method for providing pressure relief remote from, and independent of, the surge protection system typically integrated into a load compressor. According to one aspect, a pressure relief assembly includes a cover, a first chamber, a second chamber, and a piston. The cover is configured to seal a relief aperture in a sidewall of a duct when the cover is in a closed configuration. The cover is configured to expose the relief aperture to an external environment when positioned in an open configuration. The first chamber is partially defined by the sidewall of the duct and has a first volume open to the interior volume of the duct via a first orifice. The second chamber is partially defined by the sidewall of the duct and has a second volume that is open to the interior volume of the duct via a second orifice. The second orifice has a larger area than the area of the first orifice. The piston is connected to the cover and is positioned between the first and second chambers. The piston changes the volumes of the first and second chambers in response to a change in pressure within the chambers.

According to yet another aspect, a method for providing pressure relief is provided. The method includes receiving a portion of a gas from an interior of a duct through a first orifice at a first chamber of a pressure relief assembly. A second portion of the gas is received from the interior of the duct through a second orifice at a second chamber of the pressure relief assembly. The second orifice has a larger area than that of the first orifice. In response to a pressure differential between first and second chambers, a piston is moved, decreasing a volume of the first chamber while increasing a volume of the second chamber. When the piston moves, a cover connected to the piston moves from a closed configuration sealing a gas within the duct to an open configuration in which the cover exposes a relief aperture in the sidewall of the duct to allow the gas within the duct to escape to an external environment.

According to another aspect, a pressure relief system is provided for providing pressurized air to an aircraft engine with protection from pressure surges. The system includes an APU relief valve and a pressure relief assembly. The APU relief valve is positioned near a load compressor. The pressure relief assembly is integrated into a sidewall of a duct and is positioned downstream of the APU relief valve near a main engine start system associated with the aircraft engine.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
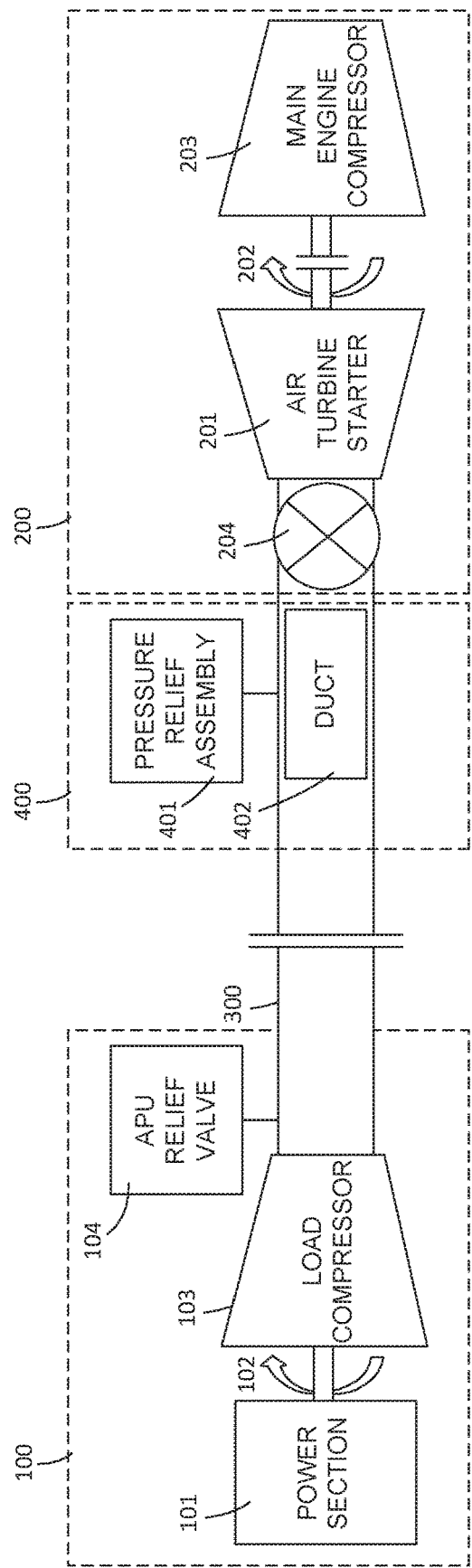
FIG. 1 is a block diagram of an auxilliary power unit (APU) system, main engine start system, and remote pressure relief system according to various embodiments described herein.

The following detailed description is directed to a pressure relief assembly and system and corresponding method for utilizing the same. As discussed above, conventional auxilliary power unit (APU) systems are designed for a particular platform having specific operating parameters.

When components of that platform change, the operating parameters may also change. Unless the APU is modified, or the integrated APU relief valve incorporated into the APU is replaced, the load compressor within the APU may be subjected to a surge in pressure. Replacing or redesigning the APU is a costly solution.

Utilizing the concepts and technologies described herein, a pressure relief assembly may be integrated into a duct and positioned close to the pneumatic load, such as the engine start system. By positioning the pressure relief assembly close to the load rather than close to the APU as is typical, a flow sink is created in a position where the surge condition is initiated, decreasing the burden on the APU relief valve. The pressure relief assembly described herein effectively becomes a remote and independent sensor for the APU load compressor, reacting to a surge condition at a distant location from the compressor at or near the load, which is the source of the surge. The time delay between the surge initiation and the activation of the surge protection approaches zero since the pressure relief assembly is located proximate to the load rather than the APU.

Another benefit of the pressure relief assembly described herein as compared to the conventional APU and integrated APU relief valve is the integration of the pressure relief assembly into a section of a duct in a low profile manner. The portion of the duct with the pressure relief assembly may be placed into an existing duct system at a desired location without removing, replacing, or modifying the existing APU or APU relief valve. The low profile nature of the pressure relief assembly and corresponding duct allows for easy installation within an aircraft where space and weight considerations are significant.

Moreover, conventional APU systems utilize two controllers and an APU relief valve. One controller monitors and responds to changes in pressure, while the second controller monitors and responds to flow rates. In contrast, the pressure relief assembly described below does not utilize any electronics or controllers for operation. Rather, the configuration of the pressure relief assembly responds to pressure gradients to mechanically move a piston and corresponding cover to seal and expose a relief aperture in the duct.

In the following detailed description, references are made to the accompanying drawings that form a part hereof, and which are shown by way of illustration, specific embodiments, or examples. Referring now to the drawings, in which like numerals represent like elements through the several figures, a pressure relief assembly, system, and corresponding method for using the same according to the various embodiments will be described.

FIG. 1 shows a block diagram of an APU system 100, the main engine start system 200, and remote pressure relief system 400 according to various embodiments described herein. The APU system 100 and main engine start system 200 are illustrated with only certain components used in the discussion below for clarity purposes. It should be appreciated that the APU system 100 and main engine start system 200 are not limited to the components shown and described herein, and may include greater or fewer components than those illustrated in FIG. 1.

The APU system 100 includes a power section 101, connected by a shaft 102 to a load compressor 103, and an APU relief valve 104. The various examples discussed below will be described in the context of an APU system 100 providing pressurized air to a main engine start system 200 of an aircraft for starting purposes. The main engine start system 200 includes an air turbine starter 201, connected by a shaft 202 to the main engine compressor 203, and a quick-closing valve 204 to initiate and end the start sequence. Accordingly, for the purposes of this disclosure, the APU system 100 will be described as a pneumatic source of pressurized air flow to the load, which is the main engine start system 200 of the aircraft. However, it should be understood that the APU system 100 may include any type of pneumatic source providing pressurized gas to any type of load, and is not limited to an APU 100 providing pressurized air to the main engine start system 200 of an aircraft.

The pressurized air is routed from the APU system 100 to the main engine start system 200 load via a duct system 300. The duct system 300 includes any length and number of duct sections coupled together to form a pathway from the APU system 100 to the main engine start system 200. In conventional aircraft, the APU system 100 is often located in the rear of the aircraft, with ducts routing air forward to an aircraft engine mounted under a wing of the aircraft. Conventional aircraft APU systems 100 include an APU relief valve 104 integrated with the load compressor 103. The APU relief valve 104 is located at or near the load compressor 103 and operates to relieve pressure within the duct system 300 to prevent surge conditions from entering the load compressor 103 and causing operational transients of the load compressor 103. However, as discussed above, the APU relief valves 104 associated with conventional load compressors 103 are not always adequate to prevent surge damage due to the positioning of the valve close to the load compressor 103, which does not allow for sufficient time for the valve to dissipate the pressure before the surge enters the APU load compressor 103, as well as due to the APU relief valve 104 being incapable of handling surge conditions associated with a new or modified aircraft main engine start system 200 or air turbine starter 201 for which the APU relief valve 104 was not designed.

The main engine start system 200 may also include a quick-closing valve 204. The quick-closing valve 204 is functional to stop the flow of pressurized air to the load when the load no longer needs or is incapable of receiving the pressurized air. Closing this valve during the operation of the load compressor 103 may create a surge condition as the pressurized air within the duct system has no flow sink, or no place to go. In conventional APU systems, this buildup in pressure increases rearward toward the load compressor 103. Due to the length of the duct system 300 and positioning of the APU relief valve 104, the pressure increase within the duct system 300 may be too severe for the APU relief valve 104 to dissipate, or dissipate quickly enough, before reaching the load compressor 103.

According to various embodiments described herein, a pressure relief system 400 is positioned proximate to the main engine start system 200. The pressure relief system 400 responds to an increase in pressure within the duct system 300 to open a relief aperture and vent pressurized air to the external environment surrounding the duct system 300. As shown in FIG. 1, the pressure relief system 400 is positioned proximate to the main engine start system 200, in contrast to the APU relief valve 104, which is positioned proximate to the load compressor 103. Another way of describing the positioning of the pressure relief system 400 is that the pressure relief system 400 is positioned at a location within the duct system 300 that is closer to the load, or main engine start system 200, than to the APU system 100.

The precise positioning of the pressure relief system 400 is dependent upon the particular application. Specifically, the characteristics of the APU system 100, the APU relief valve 104, and the main engine start system 200 or other load, as well as the sizing and length of the duct system 300, are all factors to be considered when determining the placement of the pressure relief system 400. The distance that the load is from the APU system 100 and the speed at which the APU relief valve 104 operates may drive the placement of the pressure relief system 400. In sum, the remote placement of the pressure relief system 400 away from the APU system 100 provides relief so that the APU system 100 is not as sensitive to the load going offline too quickly, enabling the flow from the APU system 100 to be maintained even when the load is unable to accept the flow.

According to various embodiments, the pressure relief system 400 includes a pressure relief assembly 401 integrated into a duct 402. The duct 402 may include any section or portion of ducting within the duct system 300. For example, according to one embodiment, a section of a duct 402 may be fitted with the pressure relief assembly 401 described below and used to replace a similar section of the duct system 300 at the desired location. Moreover, when retrofitting a conventional APU system with the pressure relief system 400 described herein, an applicable portion of the duct system 300 may be removed and replaced with the pressure relief system 400 that includes the duct 402 with integrated pressure relief assembly 401. Removing and replacing the applicable portion of the duct system 300 may include removing fasteners connecting the portion to adjacent portions of the duct system 300, removing the portion, positioning the duct 402 in place, and utilizing fasteners to secure the duct 402 to adjacent portions of the duct system 300. Alternatively, an applicable portion of the duct system 300 may be cut away and the duct 402 with integrated pressure relief assembly 401 may be spliced into the location where the portion was removed using fasteners, welds, adhesive, or any suitable mechanism for securing the duct 402 in place.

Figure 2A:
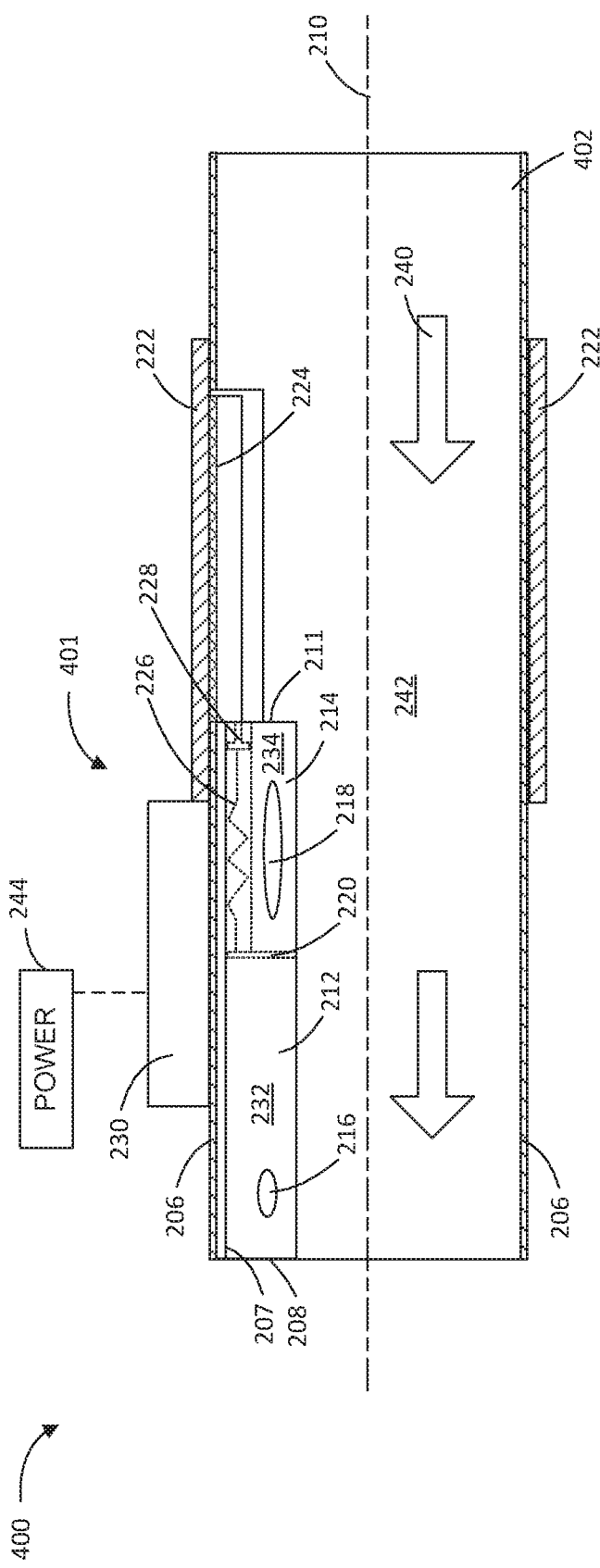
FIGS. 2A and 2B are cross-sectional diagrams of a duct and pressure relief assembly in closed and open configurations, respectively, illustrating various aspects of a pressure relief system according to various embodiments described herein.
Figure 2B:
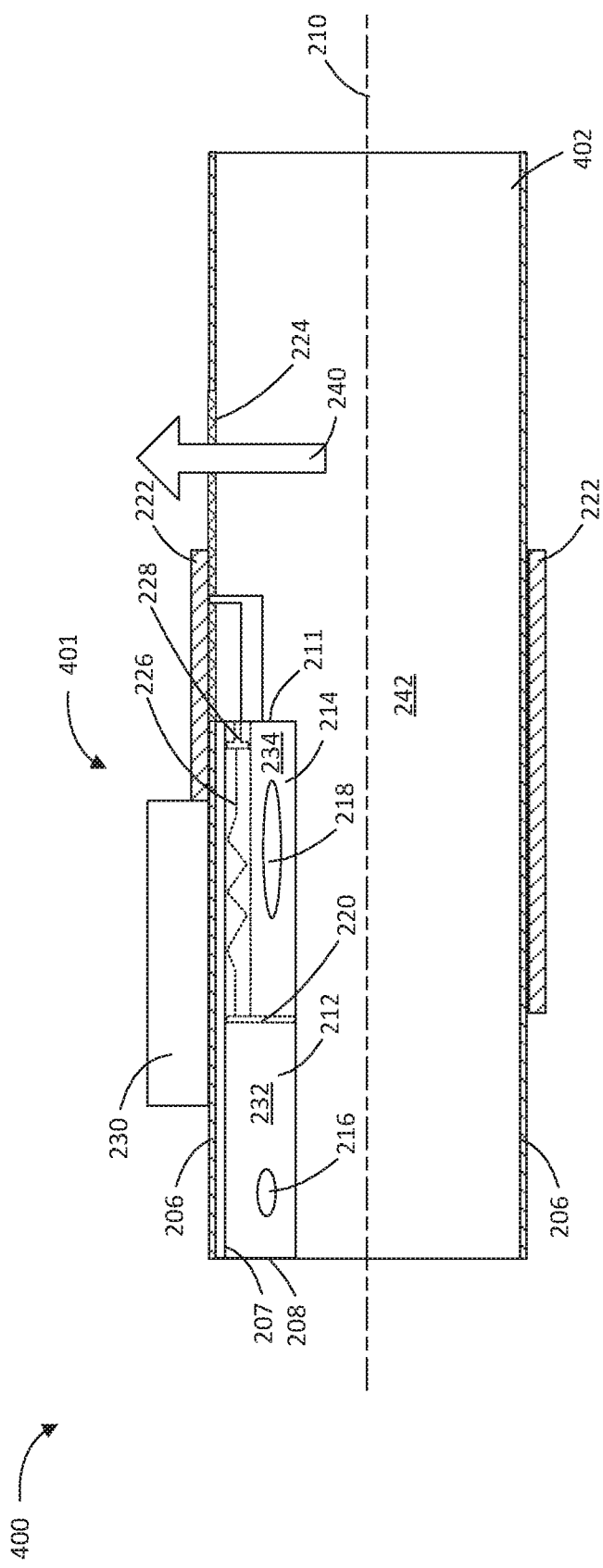

Turning now to FIGS. 2A and 2B, a pressure relief system 400 will be described in greater detail. FIG. 2A shows the pressure relief system 400 configured with a cover 222 in a closed configuration so that all pressurized air 240 from the APU system 100 is routed to the main engine start system 200. FIG. 2B shows the pressure relief system 400 configured with the cover 222 in an open configuration that allows pressurized air 240 to be vented to an external environment when pressure within the duct 402 exceeds a predetermined amount in order to prevent a surge condition.

The pressure relief system 400 includes a duct 402 and a pressure relief assembly 401, which is integrated into the duct 402. As previously discussed, the duct 402 may be a section of ducting that is sized to mate with adjacent sections of the duct system 300 at a location near the load. The duct 402 includes an interior volume 242 defined by a sidewall 206. The duct 402 may have any cross-sectional shape. The duct 402 routes the pressurized air 240 from the duct system 300 downstream of the duct 402 to the main engine start system 200, or other load, upstream of the duct 402.

The pressure relief assembly 401 includes two chambers separated by a piston 220. The first chamber 212 is at least partially defined by the sidewall 206. The sidewall 206 becomes an outer wall of the first chamber, while an inner wall 207 is opposite the sidewall 206 and closest to the interior volume 242 of the duct 402. A first end wall 208 provides a fixed wall coupling the sidewall 206 to the inner wall 207 at one end of the first chamber 212, while the piston 220 provides a moveable end wall at an opposing end of the first chamber 212. Moving the piston 220 axially parallel to a central axis 210 through the duct 402 changes a first volume 232 of the first chamber 212. Pressurized air 240 or other gas within the interior volume 242 of the duct 402 is fluidly coupled to the pressurized air 240 of the first volume 232 of the first chamber 212 through a first orifice 216. The first orifice 216 may be sized and shaped as desired and is not limited to the size and shape shown in FIGS. 2A and 2B. Similarly, there may be more than one first orifice 216 in the inner wall 207 of the first chamber 212 that allows pressurized air 240 to flow between the duct 402 and the first chamber 212.

The pressure relief assembly 401 has a second chamber 214 adjacent to the first chamber 212. The second chamber 214 is at least partially defined by the sidewall 206. As with the first chamber 212, the sidewall 206 becomes the outer wall of the second chamber 214, while the inner wall 207 is opposite the sidewall 206 and closest to the interior volume 242 of the duct 402. A second end wall 211 provides a fixed wall coupling the sidewall 206 to the inner wall 207 at one end of the second chamber 214. As stated above, the piston 220 provides a moveable end wall at an opposing end of the second chamber 214 that is shared with the first chamber 212. Moving the piston 220 axially parallel to the central axis 210 through the duct 402 changes not only the first volume 232 of the first chamber 212, but also a second volume 234 of the second chamber 214. Pressurized air 240 or other gas within the interior volume 242 of the duct 402 is fluidly coupled to the pressurized air 240 of the second volume 234 of the second chamber 214 through a second orifice 218. The second orifice 218 may be sized and shaped as desired and is not limited to the size and shape, or to a single orifice, as shown in FIGS. 2A and 2B.

The piston 220 is free to move axially parallel to the central axis 210. The piston 220 is coupled to a cover 222. The cover 222 is configured to seal a relief aperture 224 in the sidewall 206 of the duct 402 when positioned in a closed configuration as shown in FIG. 2A, and to expose the relief aperture to an external environment when positioned in an open configuration as shown in FIG. 2B. As the piston 220 moves, the piston 220 simultaneously increases the volume of one chamber and decreases the volume of the other chamber. For example, as the piston 220 moves to the left in FIG. 2A, the first volume 232 of the first chamber 212 decreases while the second volume 234 of the second chamber 214 increases. Because the cover 222 is coupled to the piston 220, as the piston 220 moves to the left, the cover 222 transitions from the closed configuration shown in FIG. 2A to the open position shown in FIG. 2B. Conversely, as the piston 220 moves to the right in FIG. 2B, the first volume 232 of the first chamber 212 increases while the second volume 234 of the second chamber 214 decreases, transitioning the attached cover 222 from the open configuration shown in FIG. 2B to the closed configuration shown in FIG. 2A.

Also as shown in FIG. 2A, the piston 220 is biased in a closed position in which the first volume 232 of the first chamber 212 is larger than the second volume 234 of the second chamber 214. The piston 220 may be biased against a stopper (not shown) using a spring 226. The spring 226 is coupled at a first end to the piston 220 and at a second end to a fixed component of the pressure relief assembly 401. According to one embodiment, the fixed component is a set screw 228. By coupling the spring 226 to a set screw 228, the tension force in the spring 226 may be selectively modified with the set screw 228 in order to adjust the amount of force required to move the piston 220 and decrease the first volume 232 of the first chamber 212.

The piston 220 is set in motion as a result of a pressure differential in the between the pressure of the pressurized air 240 within the first volume 232 of the first chamber 212 and the pressure of the pressurized air 240 within the second volume 234 of the second chamber 214. Because both the first chamber 212 and the second chamber 214 are both exposed to the interior volume 242 of the duct 402 via the first orifice 216 and the second orifice 218, respectively, as the pressure within the interior volume 242 of the duct 402 increases, the pressure within the first volume 232 and the second volume 234 also increases. However, due to the differing volumes of the first volume 232 and the second volume 234, and due to the differing areas of the first orifice 216 and of the second orifice 218, the pressure within the two chambers increases at different rates. The resulting pressure differential between the two chambers applies a force to the piston 220, pushing the piston 220 towards the chamber of lower pressure.

According to an alternative embodiment, the first volume 232 and the second volume 234 may be equivalent when the cover 222 is in the closed configuration. As long as the area of the second orifice 218 is larger than the area of the first orifice 216, pressurized air or gas from the interior volume 242 of the duct 402 may enter the second chamber 214 more quickly than the first chamber 212. In doing so, the pressure differential between the two chambers increases and the piston 220 is moved to reposition the cover 222 in the open configuration.

As seen in FIG. 2A, according to one embodiment, the second volume 234 is smaller than the first volume 232 when the cover 222 is configured in the closed configuration. Moreover, the second orifice 218 has a larger area than an area of the first orifice 216. Because high pressure air can fill and increase the pressure within the second chamber 214 more quickly than the air can fill and increase the pressure within the first chamber 212 due to the smaller volume of the second chamber 214 and the larger area of the second orifice 218, a pneumatic surge condition that quickly increases the pressure within the duct 402 will create a pressure differential that moves the piston 220 toward the first chamber 212. This movement moves the cover 222 to the open configuration of FIG. 2B, allowing the pressurized air 240 within the duct 402 to escape to the external environment via the relief aperture. When enough of the pressurized air 240 vents to the external environment, the pressure differential between the first chamber 212 and the second chamber 214 decreases to a value in which the force created by the pressure differential and applied to the piston 220 is not sufficient to overcome the biasing force on the piston 220 from the spring 226. When this happens, the piston 220 is pulled back into place by the spring 226 so that the attached cover 222 seals the relief aperture 224.

According to various embodiments, the pressure relief assembly 401 may include an electronic safety mechanism 230 that is coupled to the cover 222 and is configured to secure the cover 222 in the closed configuration when the electronic safety mechanism 230 is de-energized when a power supply 244 does not transmit electrical power to the electronic safety mechanism 230. As an example, the electronic safety mechanism 230 may be a solenoid motor that when de-energized, prevents the cover 222 from moving from the closed configuration. In other words, when the power supply 244 de-energized the electronic safety mechanism 230, the cover 222 cannot move the open configuration. This safety mechanism 230 may be locked into the closed configuration at any time in which it would not be desirable to open the cover 222, such as during engine start.

Figure 3:
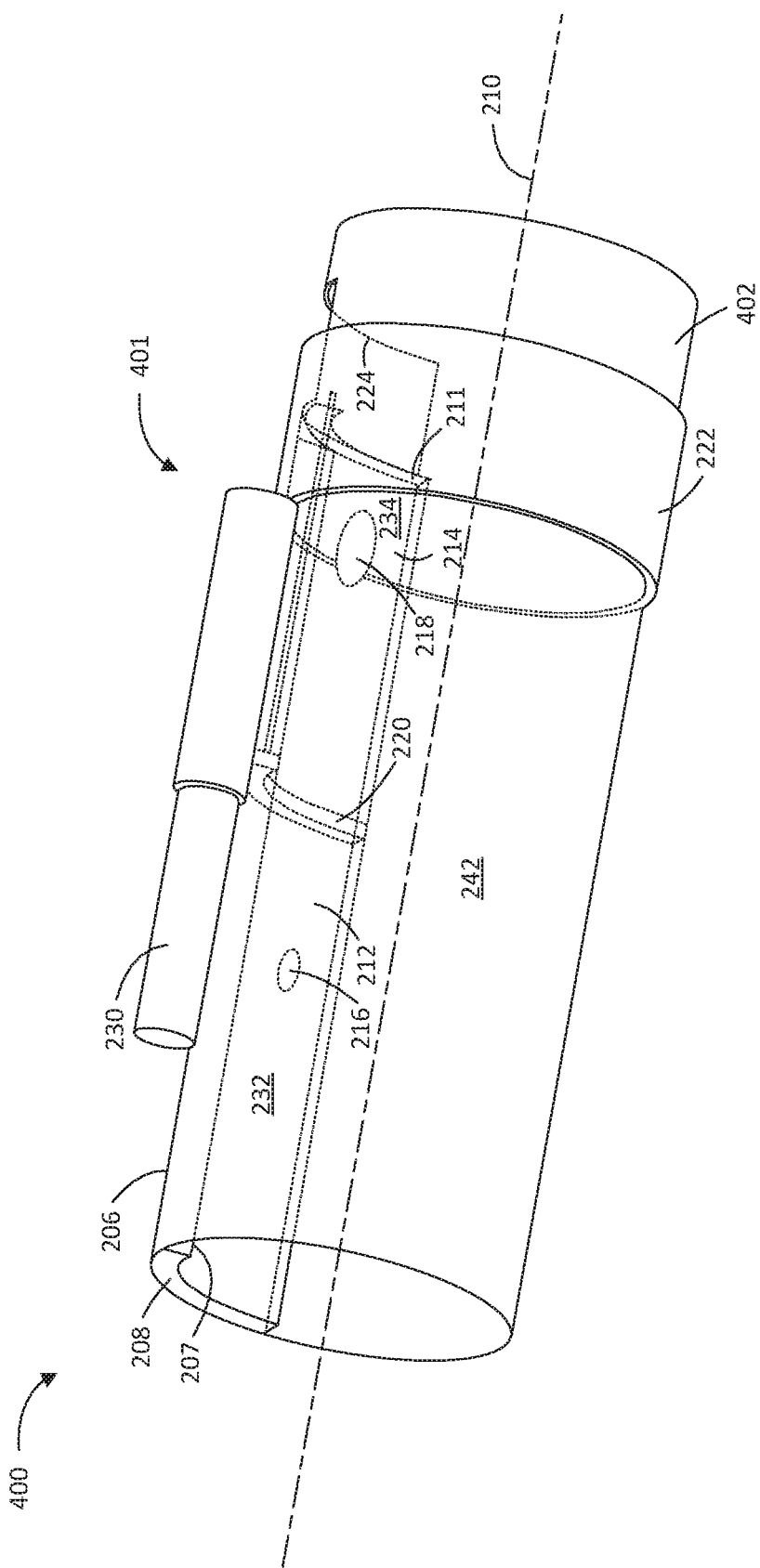
FIG. 3 is a perspective view of a pressure relief system according to alternative embodiments described herein.

FIG. 3 shows a perspective view of a pressure relief system 400 according to various embodiments. It should be appreciated that all components of the pressure relief system 400 are not shown for clarity purposes. As one example, the spring 226 and set screw 228 are not shown. This view provides a better visualization of the first chamber 212 and the second chamber 214 with the piston 220 providing a movable wall shared by both chambers. According to this embodiment, the cover 222 slides axially parallel to the central axis 210 to cover and seal the relief aperture 224 in the closed configuration and to expose the relief aperture 224 in the open configuration. The configuration of the cover 222 and how the cover 222 seals and exposes the relief aperture 224 is not limited to the configuration shown in FIGS. 2A, 2B, and 3. Rather, any configuration in which the cover 222 may be opened and closed via the movement of the piston 220 may be used. FIGS. 4A-4C, 5A, and 5B provide non-limiting alternative embodiments, illustrating additional configurations for opening and closing the cover 222. For clarity purposes, all components of the pressure relief system 400 other than the duct 402, the cover 222, and the relief aperture 224 have been removed. The mechanical connections of the cover 222 to the piston 220 may be designed in any suitable manner known to those with skill in the art to effectuate the opening and closing operation described below with respect to each embodiment.

Figure 4A:
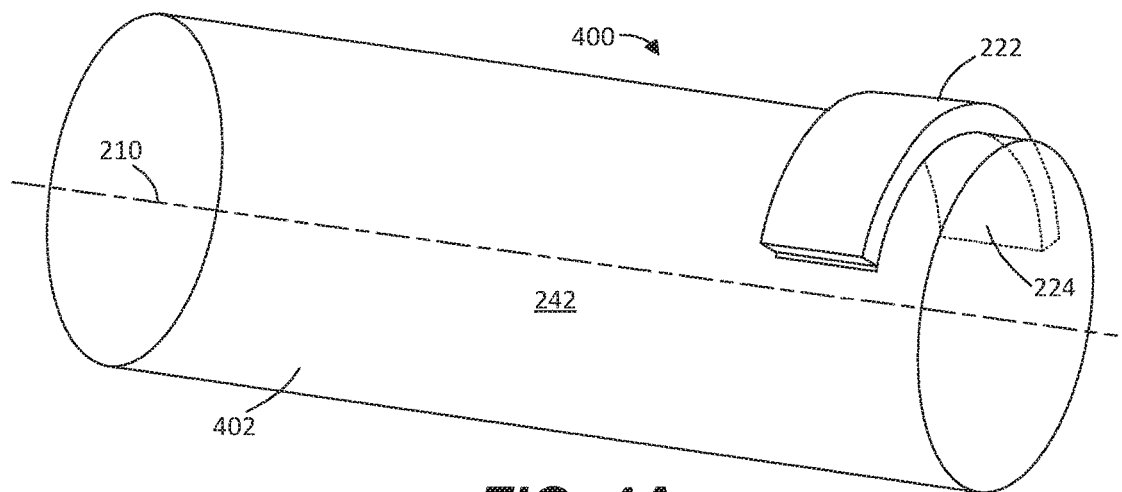
FIG. 4A is a perspective view of a pressure relief system showing an embodiment of a cover in a closed configuration according to alternative embodiments described herein.
Figure 4B:
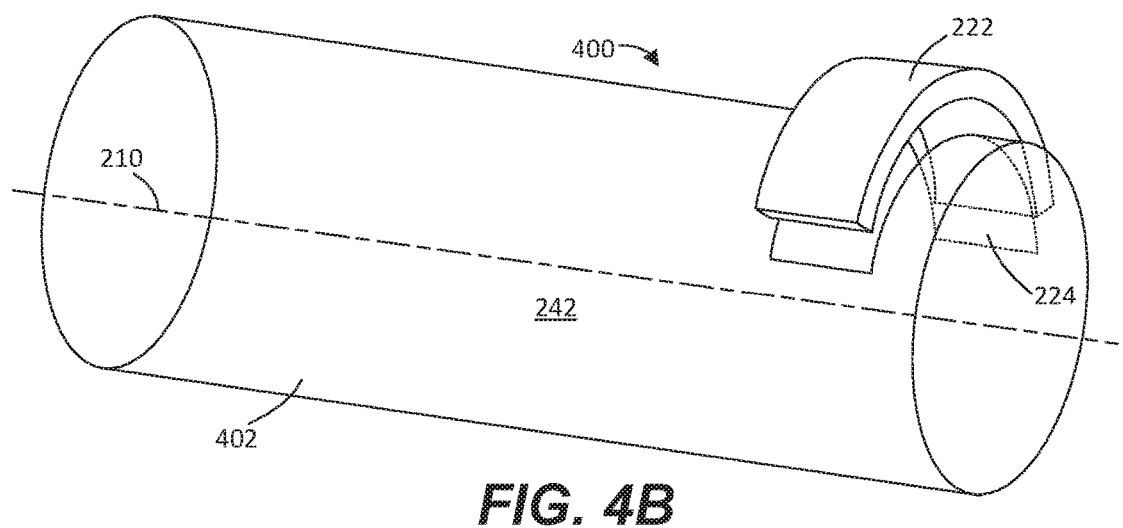
FIGS. 4B and 4C are perspective views of the pressure relief system of FIG. 4A showing embodiments of the cover in an open according to alternative embodiments described herein.
Figure 4C:
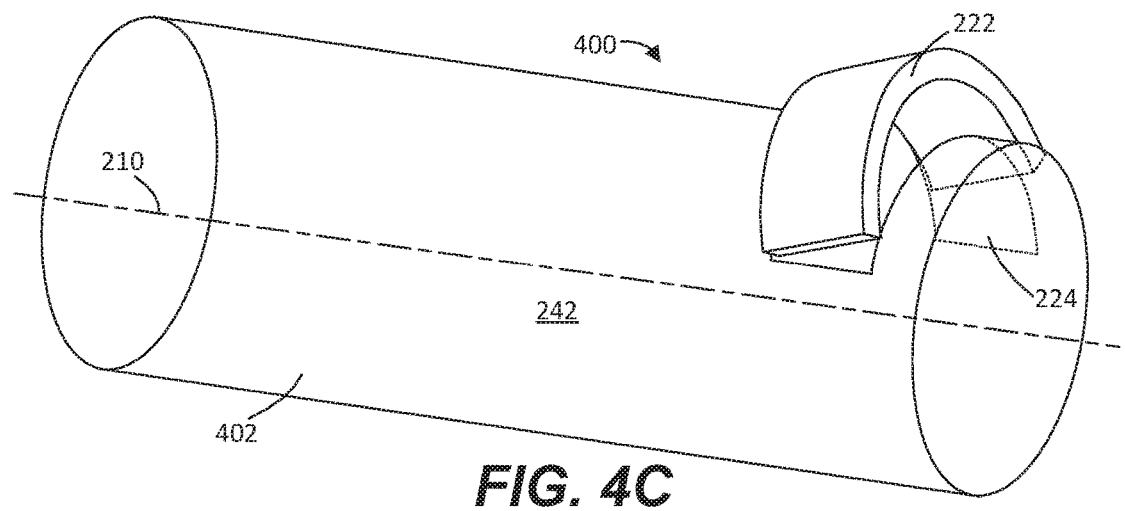

FIGS. 4A-4C are perspective views of embodiments in which the cover 222 does not fully encompass the outer circumference of the duct 402. In these examples, the cover 222 partially wraps around the outer surface of the duct 402 and is at least as large as the relief aperture 224. FIG. 4A shows the cover 222 positioned in the closed configuration in which the cover 222 is sealing the relief aperture 224 to prevent pressurized air 240 from escaping from the interior volume 242 of the duct 402. According to the embodiment shown in FIG. 4B, the cover 222 opens by moving upward away from the relief aperture 224 to expose the relief aperture 224 to the external environment. This movement can be in a direction normal to the central axis 210 as shown in FIG. 4B. Alternatively, as shown in FIG. 4C, the movement of the cover 222 may be rotational such that a portion of the cover 222 moves upward away from the relief aperture 224 to expose the relief aperture 224 to the external environment and allow the excess pressure to be released from the duct 402.

Figure 5A:
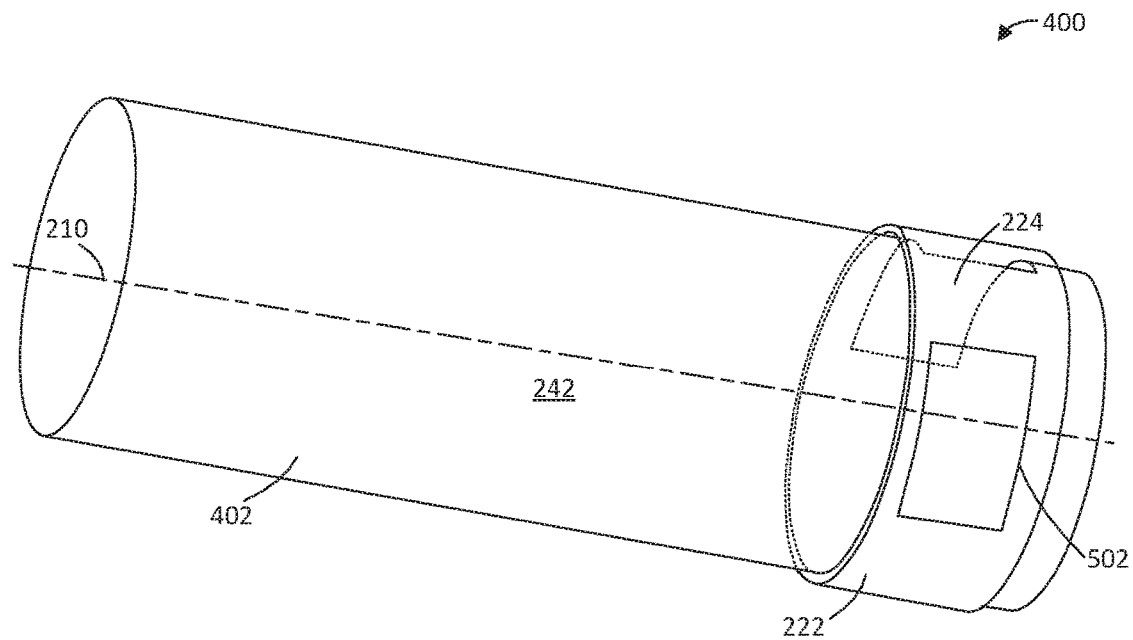
FIGS. 5A and 5B are perspective views of a pressure relief system in closed and open configurations, respectively, showing embodiments of a cover having a cover aperture according to alternative embodiments described herein.
Figure 5B:
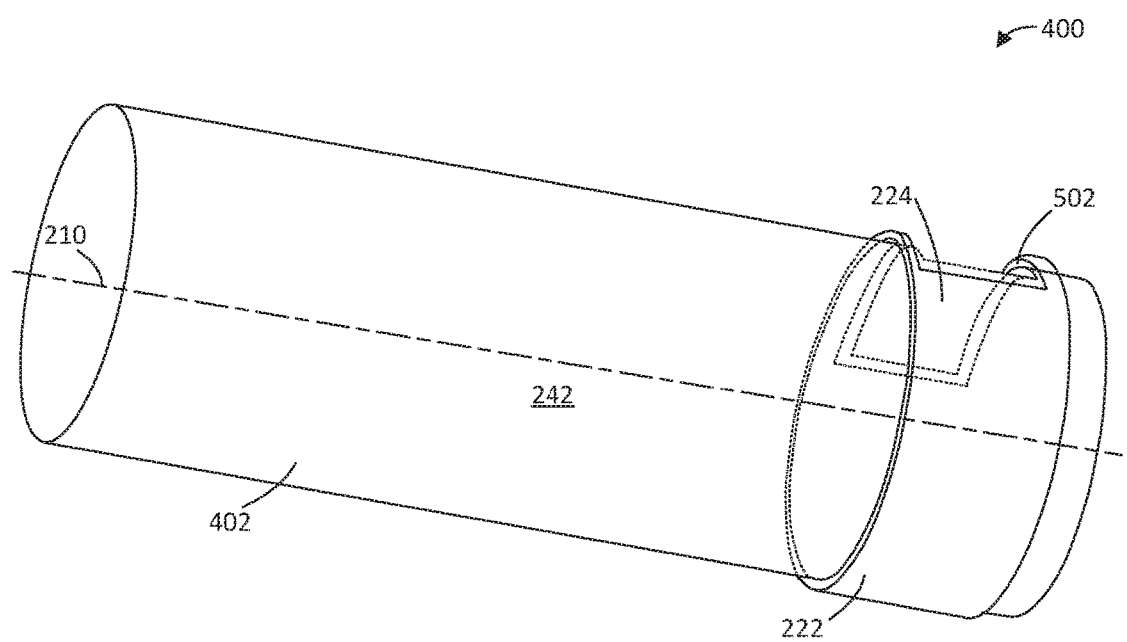

FIGS. 5A and 5B show perspective views of an embodiment in which the cover 222 rotates around the central axis 210 of the duct 402 to cover the relief aperture 224 in the closed configuration and to expose the relief aperture 224 in the open configuration. As seen in FIG. 5A, the cover 222 has a cover aperture 502 that when is not aligned with the relief aperture 224 in the closed configuration. However, as seen in FIG. 5B, transitioning the cover 222 from the closed configuration to the open configuration involves rotating the cover 222 until the cover aperture 502 aligns with the relief aperture 224 to expose the relief aperture 224 to the external environment.

Figure 6:
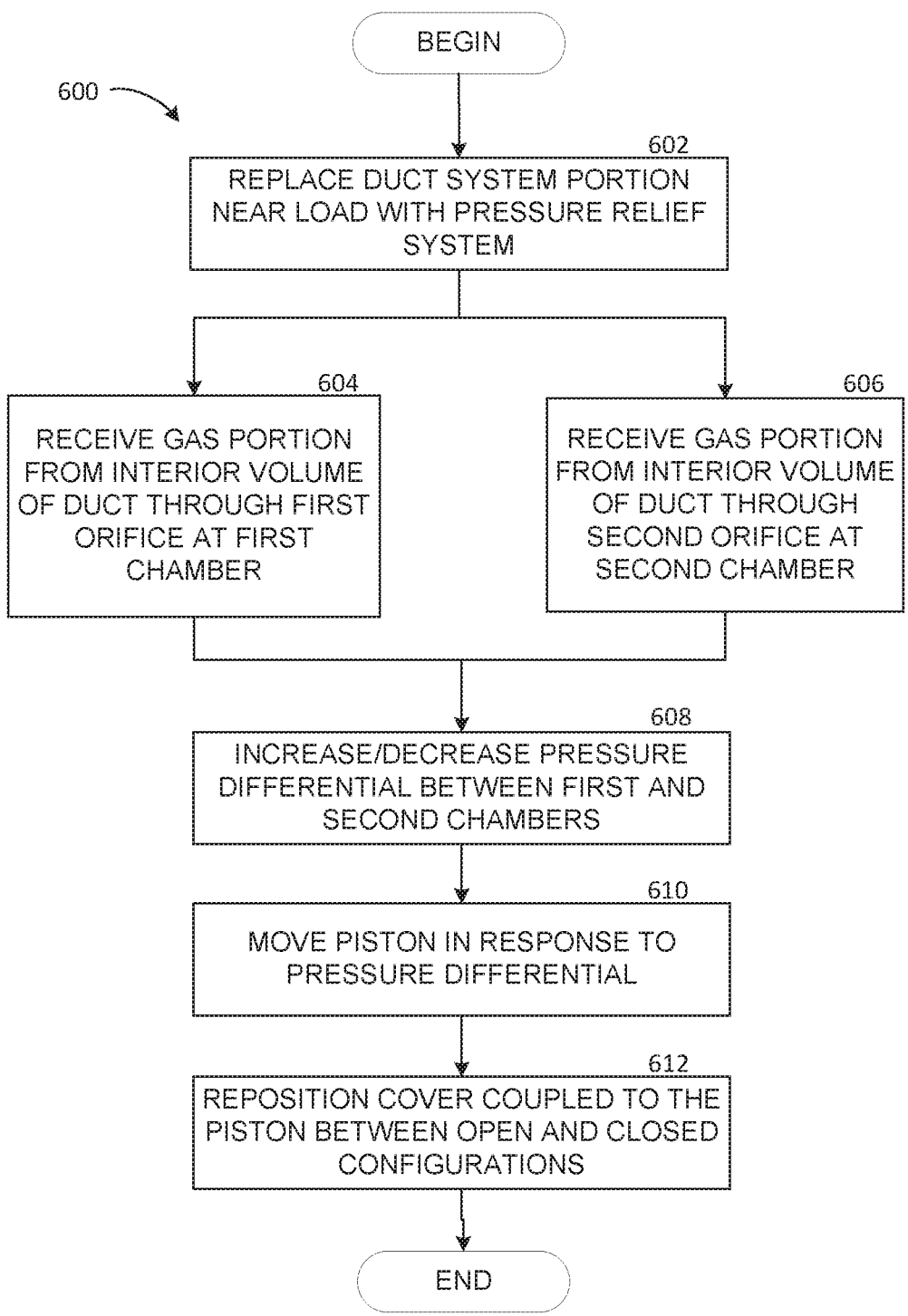
FIG. 6 is a flow diagram showing a method for providing pressure relief within a duct fluidly coupled to a compressor and a load according to various embodiments presented herein.

FIG. 6 shows a routine 600 for providing pressure relief within a duct 402 fluidly coupled to a load compressor 103 and a load according to various embodiments presented herein. It should be appreciated that more or fewer operations may be performed than shown in the figures and described herein. These operations may also be performed in parallel, or in a different order than those described herein.

The routine 600 begins at operation 602, where if the pressure relief system 400 is being retrofit into an existing APU system, a portion of the duct system 300 is replaced with the duct 402 near the load. At operation 604, a portion of the gas within the interior volume 242 of the duct 402 is received within the first chamber 212 through the first orifice 216. At the same time, at operation 606, another portion of the gas within the interior volume 242 of the duct 402 is received within the second chamber 214 through the second orifice 218.

Because the second orifice 218 of the second chamber 214 is larger in area than the first orifice 216 of the first chamber 212, and because the second volume 234 of the second chamber 214 is smaller than the first volume 232 of the first chamber 212, the gas within the interior volume 242 of the duct 402 enters the second chamber 214 more quickly, and the pressure builds within more quickly, than the first chamber 212. As a result, at operation 608, the pressure differential between the first chamber 212 and the second chamber 214 increases as the pressure within the interior volume 242 of the duct 402 increases. Conversely, as the pressure within the interior volume 242 of the duct 402 decreases, the pressure differential decreases to a level below that of the force from the spring 226.

At operation 610, in response to the pressure differential increase or decrease, the piston 220 moves. If the pressure differential between the first chamber 212 and the second chamber 214 increases due to an increase of pressure within the duct 402, then the pressure differential between the chambers causes the piston 220 to move towards the first chamber 212. However, if the pressure differential between the first chamber 212 and the second chamber 214 decreases due to a decrease of pressure within the duct 402, then when the force from the spring 226 is greater than any force on the piston 220 from the pressure differential between the chambers, the piston 220 moves towards the second chamber 214.

At operation 612, the cover 222 is repositioned, transitioning between open and closed configurations, as a result of the piston 220 movement. Because the cover 222 is coupled to the piston 220, as the piston 220 moves towards the first chamber 212, the cover 222 moves from the closed configuration to the open configuration to allow for pressurized gas within the interior volume 242 of the duct 402 to escape to the external environment. As the piston 220 moves towards the second chamber 214, the cover 222 moves from the open configuration to the closed configuration to seal the relief aperture 224 and prevent pressurized gas from escaping to the external environment. From operation 612, the routine 600 ends.

Based on the foregoing, it should be appreciated that technologies for a pressure relief assembly and system for use with a duct to protect an associated compressor, and a corresponding method for utilizing the same are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A pressure relief assembly for use with a duct having an interior volume defined by a sidewall and a relief aperture defined through the sidewall of the duct, the pressure relief assembly comprising:
a cover configured to seal the relief aperture when positioned in a closed configuration and to expose the relief aperture to an external environment when positioned in an open configuration;
a first chamber at least partially defined by the sidewall and having a first volume fluidly coupled to the interior volume of the duct through a first orifice;
a second chamber at least partially defined by the sidewall and having a second volume fluidly coupled to the interior volume of the duct through a second orifice, the second orifice having a larger area than an area of the first orifice; and
a piston coupled to the cover, positioned between the first chamber and the second chamber and defining a wall of the first chamber and the second chamber, and configured to change the first volume and the second volume in response to a change in pressure in at least the first chamber or the second chamber.

2. The pressure relief assembly of claim 1, wherein the cover slides axially parallel to a central axis of the duct to cover the relief aperture in the closed configuration and to expose the relief aperture in the open configuration.

3. The pressure relief assembly of claim 1, wherein the cover rotates around a central axis of the duct to cover the relief aperture in the closed configuration and to expose the relief aperture in the open configuration.

4. The pressure relief assembly of claim 1, wherein at least a portion of the cover moves upward away from the relief aperture to expose the relief aperture in the open configuration and moves downward toward the relief aperture to cover the relief aperture in the closed configuration.

5. The pressure relief assembly of claim 1, further comprising a spring coupled at a first end to the piston and at a second end to a fixed component of the pressure relief assembly, the spring configured to bias the cover coupled to the piston in the closed configuration.

6. The pressure relief assembly of claim 5, wherein the fixed component comprises a set screw configured to selectively modify a tension in the spring to adjust a pressure differential between the first chamber and the second chamber sufficient to transition the cover between the closed configuration and the open configuration.

7. The pressure relief assembly of claim 1, further comprising an electronic safety mechanism coupled to the cover and configured to secure the cover in the closed configuration when de-energized.

8. The pressure relief assembly of claim 7, wherein the electronic safety mechanism comprises a solenoid motor.

9. The pressure relief assembly of claim 1, wherein the pressure relief assembly is integrated into the duct, wherein the duct is configured to be positioned within a duct system associated with an auxiliary power unit (APU) of an aircraft such that airflow from the APU to an aircraft engine flows through the duct.

10. The pressure relief assembly of claim 9, wherein the duct is positioned closer to the aircraft engine than the APU within the duct system.

11. The pressure relief assembly of claim 1, wherein the second volume is smaller than the first volume when the cover is configured in the closed configuration.

12. A method for providing pressure relief within a duct fluidly coupled to a compressor and a load, the method comprising:
receiving a first portion of a gas from an interior volume of the duct through a first orifice at a first chamber of a pressure relief assembly at least partially defined by a sidewall of the duct;
receiving a second portion of the gas from the interior volume of the duct through a second orifice at a second chamber of the pressure relief assembly at least partially defined by the sidewall of the duct, the second orifice having a larger area than an area of the first orifice;

in response to a pressure differential between the first chamber and the second chamber, moving a piston and decreasing a first volume of the first chamber while increasing a second volume of the second chamber; and in response to moving the piston, repositioning a cover coupled to the piston to transition from a closed configuration in which the gas is sealed within the duct to an open configuration in which the interior volume of the duct is exposed to an external environment via a relief aperture in the sidewall of the duct to allow the gas to escape from the interior volume of the duct.

13. The method of claim 12, wherein repositioning the cover comprises sliding the cover axially parallel to a central axis of the duct to expose the relief aperture in the open configuration.

14. The method of claim 12, wherein repositioning the cover comprises rotating the cover around a central axis of the duct to expose the relief aperture in the open configuration.

15. The method of claim 12, wherein repositioning the cover comprises raising a portion of the cover upward away from the relief aperture to expose the relief aperture in the open configuration.

16. The method of claim 12, further comprising:
in response to the pressure differential returning to a value in which a biasing spring force overcomes a force associated with the pressure differential, moving the piston to increase the first volume and decrease the second volume; and
in response to moving the piston to increase the first volume and decrease the second volume, repositioning the cover coupled to the piston to transition from the open configuration to the closed configuration.

17. The method of claim 12, further comprising:
removing a portion of a duct system associated with an APU in an aircraft proximate to the load, wherein the load comprises an aircraft engine;
replacing the portion of the duct system with the duct having the pressure relief assembly such that in increase in pressure within the pressurized gas flow proximate to the aircraft engine increases the pressure differential between the first chamber and the second chamber.

18. A pressure relief system for providing pressurized air to an aircraft engine with protection from pressure surges, the system comprising:

an APU relief valve positioned proximate to a load compressor; and
a pressure relief assembly integrated into a sidewall of a duct and positioned downstream of the APU relief valve proximate to a main engine start system associated with the aircraft engine, the pressure relief assembly comprising:
a cover configured to seal a relief aperture defined through a sidewall of the duct when positioned in a closed configuration and to expose the relief aperture to an external environment when positioned in an open configuration;
a first chamber at least partially defined by the sidewall of the duct and having a first volume fluidly coupled to the interior volume of the duct through a first orifice,
a second chamber at least partially defined by the sidewall and having a second volume fluidly coupled to the interior volume of the duct through a second orifice, the second orifice having a larger area than an area of the first orifice; and
a piston coupled to the cover, positioned between the first chamber and the second chamber and defining a wall of the first chamber and the second chamber, and configured to change the first volume and the second volume in response to a change in pressure in at least the first chamber or the second chamber.

19. The pressure relief system of claim 18,
wherein the cover slides axially parallel to a central axis of the duct to cover the relief aperture in the closed configuration and to expose the relief aperture in the open configuration,
wherein the cover rotates around the central axis of the duct to cover the relief aperture in the closed configuration and to expose the relief aperture in the open configuration, or
wherein at least a portion of the cover moves upward away from the relief aperture to expose the relief aperture in the open configuration and moves downward toward the relief aperture to cover the relief aperture in the closed configuration.

20. The pressure relief system of claim 18, in which the pressure relief assembly further comprises a spring coupled at a first end to the piston and at a second end to a fixed component of the pressure relief assembly, the spring configured to bias the cover coupled to the piston in the closed configuration.

* * * * *